US006799549B1

(12) United States Patent
Patterson et al.

(10) Patent No.: US 6,799,549 B1
(45) Date of Patent: Oct. 5, 2004

(54) COMBUSTION AND EXHAUST HEADS FOR FLUID TURBINE ENGINES

(75) Inventors: David G. Patterson, Lanark County (CA); Albert Patterson, West Lorne (CA)

(73) Assignee: 1564330 Ontario, Inc., Ontario (CA)

( * ) Notice: Subject to any disclaimer, the term of this patent is extended or adjusted under 35 U.S.C. 154(b) by 0 days.

(21) Appl. No.: 10/429,881

(22) Filed: May 6, 2003

(51) Int. Cl.[7] ............................................. F02B 53/00

(52) U.S. Cl. ................. 123/204; 123/236; 123/237; 123/229; 418/260; 418/268

(58) Field of Search ............................... 123/204, 236, 123/237, 229; 418/260, 268

(56) References Cited

U.S. PATENT DOCUMENTS

| | | | | |
|---|---|---|---|---|
| 1,023,872 A | * | 4/1912 | Pearson | 418/260 |
| 1,042,595 A | * | 10/1912 | Bary | 418/260 |
| 2,476,397 A | * | 7/1949 | Pearson | 123/204 |
| 3,057,157 A | * | 10/1962 | Close | 123/204 |
| 6,554,596 B1 | | 4/2003 | Patterson et al. | 418/260 |

FOREIGN PATENT DOCUMENTS

| | | | | |
|---|---|---|---|---|
| GB | 468390 | * | 7/1937 | F02B/53/00 |
| JP | 06307252 A | * | 11/1994 | 123/243 |

* cited by examiner

*Primary Examiner*—Thomas Denion
*Assistant Examiner*—Thai-Ba Trieu
(74) *Attorney, Agent, or Firm*—Nixon Peabody LLP; Jeffrey L. Costellia

(57) ABSTRACT

An internal combustion rotary engine which includes a housing encased rotor having:

cam actuated inwardly and outwardly extending vanes, a combustion chamber communicating with a fluid inlet port to the vanes within the housing, and an exhaust chamber communicating with the fluid outlet port from the vanes of the housing, air and fuel injectors associated with the combustion chamber for delivery of an air and fuel mixture to the combustion chamber, and igniter means associated with the combustion chamber for igniting air and fuel mixture within that chamber.

Controls are provided to properly control the sequence of air and fuel injection, fuel ignition and exhaust valve opening and closing during operation of the engine to provide simpler and more economical rotary engine.

4 Claims, 3 Drawing Sheets

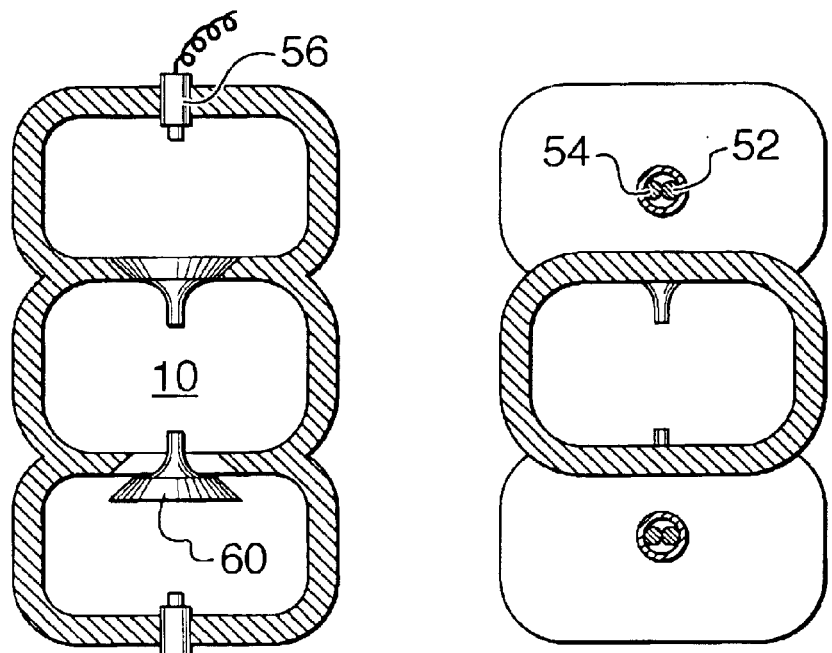
FIG. 3a
FIG. 3b
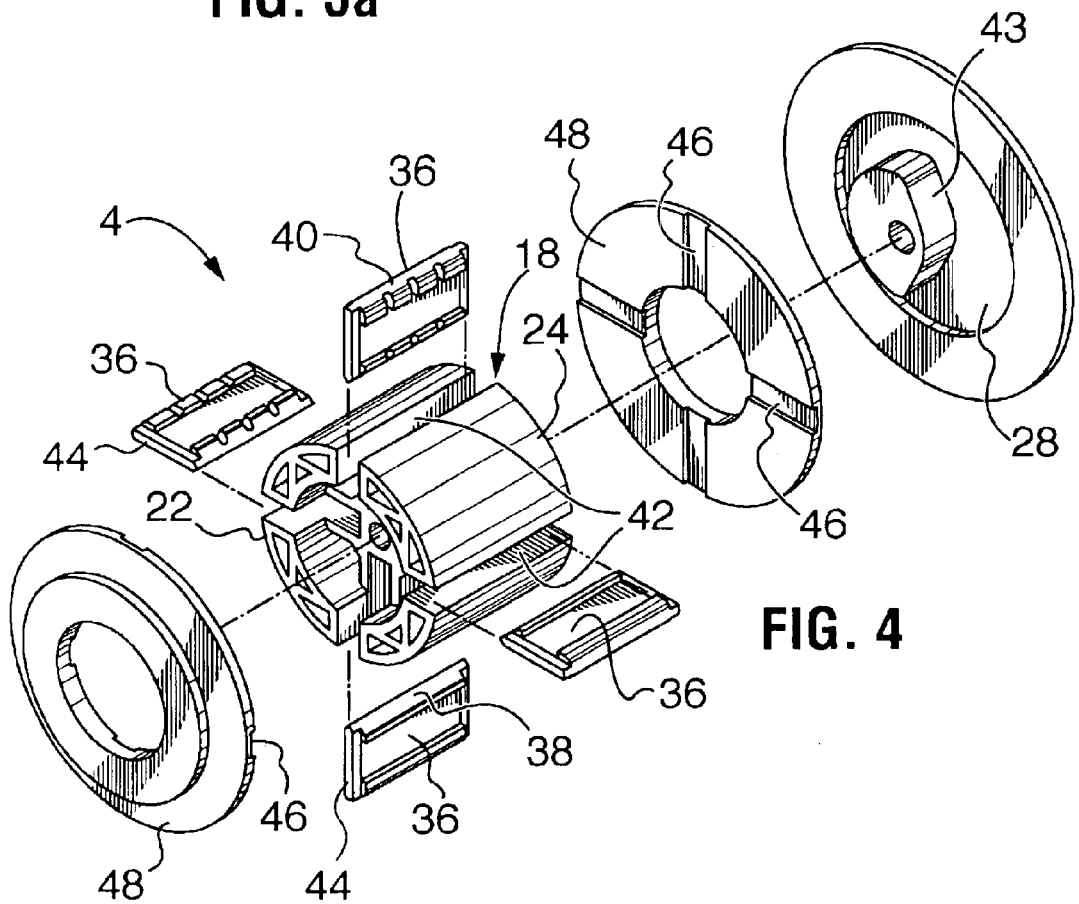
FIG. 4

COMBUSTION AND EXHAUST HEADS FOR FLUID TURBINE ENGINES

FIELD OF THE INVENTION

The present invention relates to an internal combustion rotary engine.

BACKGROUND OF THE INVENTION

Conventional internal combustion piston engines, used for powering motor vehicles and power generators and in numerous other applications have many shortcomings.

To understand some of these shortcomings, one need only review the sequence of events in a single piston engine. Combustion of the air/fuel mixture in the cylinder head commences just before the piston reaches top dead center, to have good pressure applied when the connecting rod is at its most efficient position on the crankshaft (90°). Therefore, depending upon flame front progression and the rpm of the engine, most of the high pressure occurs when the crankshaft lobe is still just off a vertical axis of the shaft center in the 10° range. This results in much of the downward force from the piston being diverted from efficient rotary movement to the application of vertical pressure on the crankshaft's main bearings. Only when the lobe of the crankshaft is at 90° to the center line of the main shaft is positioning ideal to transfer the piston's vertical force into rotary motion. At this position, however, combustion has already occurred and, as the volume of space in the cylinder has increased to one half total displacement, much of the high pressure energy from the combustion has been dissipated.

In following the sequence of events following the power stroke, including the exhausting of gases and the intake of more air/fuel mixture and compression, it should be understood that all of these steps require piston movement in either a two or four stroke engine design. These actions are dead loads requiring rotary energy to be taken back from the crankshaft. This sequence explains why engine manufacturers' efficiency ratings under ideal conditions are generally less than 35% for such internal combustion engines.

Rotary engines, such as the WANKEL (trade-mark) are attempts to address these and other problems inherent in such piston driven internal combustion engines. The idea is to provide a high torque rotary shaft powered more directly by the forces generated by the ignition of the gas/air mixture. In the case of a WANKEL engine, instead of pistons, a cam surface mounted on a rotary shaft and housed within a combustion chamber provides a replacement for pistons.

In applicant's co-pending U.S. patent application Ser. No. 09/973,782, a fluid turbine is described and illustrated having vanes protruding from a rotor at right angles to the center line of the drive shaft. The construction of that turbine enables an excellent seal between adjacent compartments and, because support for the vanes is provided at their sides, a strong, non-binding configuration is achieved. The turbine is capable of providing a more efficient conversion of energy because of the direct application of the force of the incoming fluid on the vanes. It permits the rotor to be under full power and under force of the fluid entering the inlet over one half of a revolution.

It is an object of the present invention to adapt the principles of such a turbine to provide a more efficiently operating internal combustion engine, and to use that technology in a number of different applications.

SUMMARY OF THE INVENTION

In accordance with the present invention there is provided an internal combustion rotary engine, which comprises a rotary device having a rotor, with ends and a cylindrical sidewall, and a housing encasing the rotor. A rotor disk is provided at each end of the rotor to rotate therewith. The housing has interior end walls confronting the rotor ends, interior sidewalls and fluid inlet and fluid outlet ports. A first portion of the interior sidewall of the housing is cylindrical and curved with constant radius over an angle of approximately 180°. This first portion of the interior sidewall is spaced a constant distance from corresponding portions of the wall of the rotor. A second portion of the interior sidewall of the housing continues from the extremities of the first portion and has a curvature of greater radius. The wall of the rotor meets the interior wall of the housing at a point between inlet and outlet ports about midway on this second portion. The inlet and outlet ports are located in this second portion of the interior sidewall of the housing. Two or more vanes having inner and outer ends extend parallel to the axis of the rotor and are movable radially inwardly and outwardly between retracted and extended positions with respect to the cylindrical sidewall of the rotor within slots in the rotor. The vanes have side shoulders, which slide in corresponding guide slots in the rotor disks. The outer ends of the vanes are positioned adjacent the inner wall of the housing and the vanes are spaced, preferably, equally from adjacent vanes about the rotor such that there is always at least one vane positioned between the inlet and outlet ports. Means are provided to move each of the vanes radially within its associated rotary slot between an extended position and a fully withdrawn position so that the outer extremity of each vane is positioned adjacent a corresponding portion of the inner wall of the housing. The rotor, housing and vanes are constructed so that, during operation of the device, fluid entering the housing drives the rotor and is carried by the rotor in compartments formed between adjacent vanes, the rotor sidewall between those vanes and corresponding portions of the sidewalls of the housing until the adjacent vanes encompass the outlet port whereby the fluid is allowed to escape. In addition, the engine comprises a combustion chamber communicating with the fluid inlet port and an exhaust chamber communicating with the fluid outlet port. Air and fuel injection means are associated with the combustion chamber for delivery of an air and fuel mixture to the combustion chamber. Igniter means are associated with the combustion chamber for igniting air and fuel mixture within that chamber. The exhaust chamber is provided with an exhaust valve, which closes to seal the chamber, and opens to permit exhaust gases in the chamber to escape. Means are provided to properly control the sequence of air and fuel injection, fuel ignition and exhaust valve opening and closing during operation of the engine.

In a preferred embodiment, the engine is arranged so that the combustion chamber can function as an exhaust chamber, and the exhaust chamber as a combustion chamber, whereby the rotor can be turned in an opposition direction.

The rotary engine according to the present invention is simpler and more economical to manufacture than conventional rotary engines, and has fewer components. Hence it is lighter in construction and requires less space.

BRIEF DESCRIPTION OF THE DRAWINGS

These and other advantages of the invention will become apparent upon reading the following detailed description and upon referring to the drawings in which:

FIGS. 3a and 3b are section views of the engine of FIG. 1 along lines 3a—3a; and 3b—3b respectively;

FIG. 4 is an exploded perspective view of the rotor and a portion of one end wall of the housing of the turbine of the engine of FIG. 1.

Figure 1:
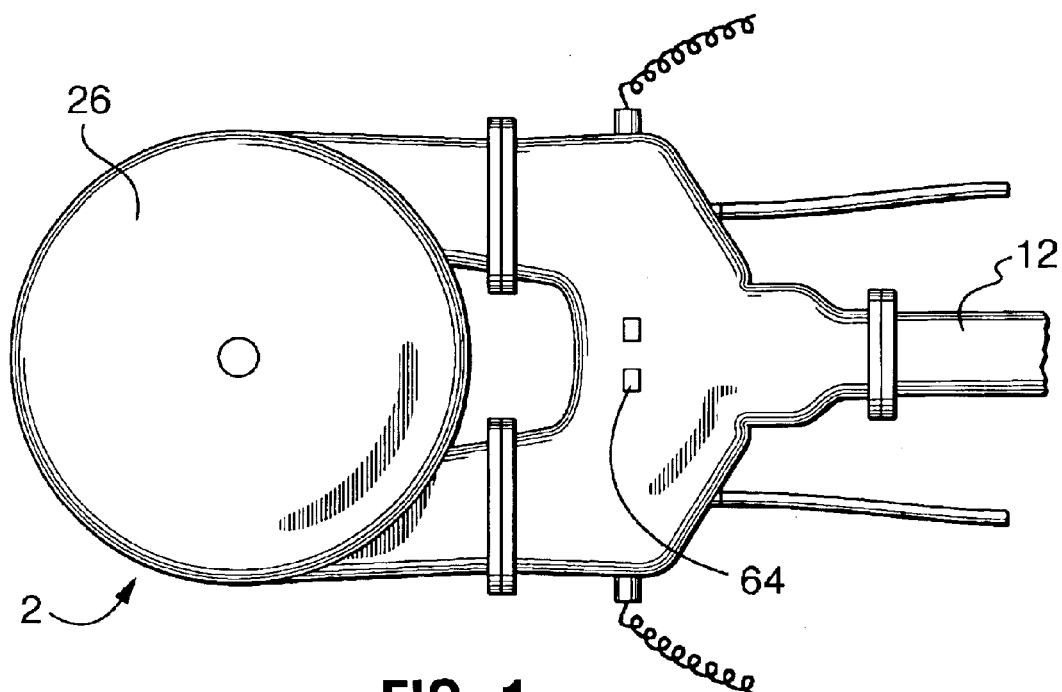
FIG. 1 is a side elevation view of a fluid turbine engine with combustion and exhaust heads in accordance with the present invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

The engine 2 according to the present invention combines a fluid turbine 4 as described and illustrated in applicant's co-pending U.S. patent application Ser. No. 09/973,782, with appropriate combustion and exhaust heads as will be described subsequently.

Figure 2:
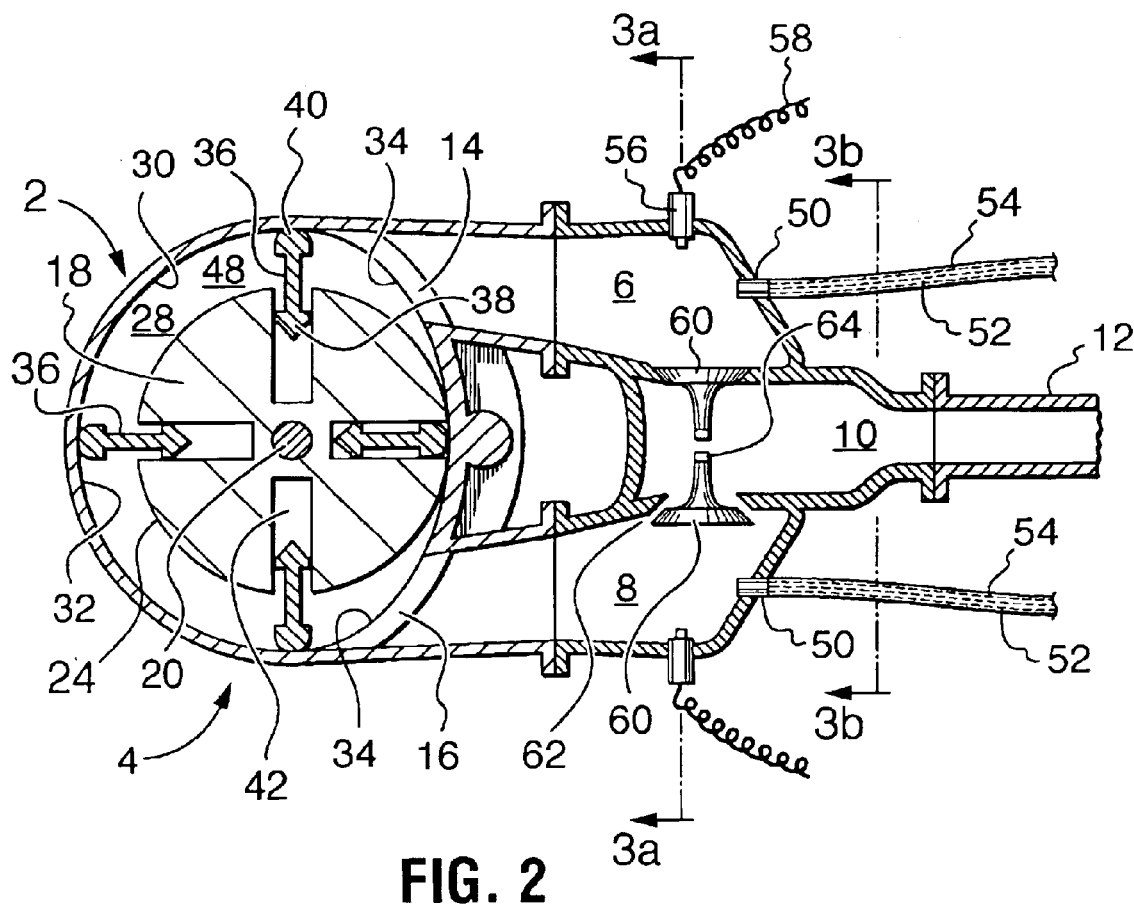
FIG. 2 is a section view of the engine of FIG. 1.

The fluid turbine 4 as can be seen in FIG. 2, operates in conjunction with a pair of chambers 6 and 8 and an exhaust chamber 10, which communicates with an exhaust pipe 12. Chambers 6 and 8 communicate with, respectively, ports 14 and 16 of fluid turbine 4. As will be described subsequently, chambers 6 and 8 and ports 14 and 16 can be arranged to have different functions, depending upon whether rotor 18 of fluid turbine 4 is driven to rotate in a clockwise or counterclockwise direction.

As will be understood from a review of FIGS. 2 and 4, turbine 4 comprises rotor 18, which is secured to and drives a shaft 20. Rotor 18 has ends 22 (FIG. 4) and a cylindrical sidewall 24. This rotor is encased within a housing 26 (FIG. 1). Housing 26 is provided with interior end walls 28 confronting rotor disks 48 on the rotor ends 22 and an interior sidewall 30, with fluid ports 14 and 16 providing either fluid inlet to or outlet from the chamber of housing 26 within which rotor 18 is seated. Housing 26 is provided with a first portion 32 of interior sidewall 30, which is cylindrical and curved with constant radius over an angle of about 180°. The first portion 32 of interior sidewall 30 is spaced a constant distance from corresponding portions of the sidewall 24 of rotor 18. Housing 26 is further provided with a second portion 34 of interior sidewall 30, which extends between the extremities of the first portion 32 and is formed with a curvature of greater radius than that of the first portion 32. Sidewall 24 of rotor 18 meets the interior sidewall portion 34 at a location approximately midway between the ports 14 and 16 on portion 34.

A series of elongated vanes 36, having inner ends 38 and outer ends 40, extend parallel to the longitudinal axis of rotor 18 and shaft 20. These vanes are oriented and movable radially with respect to rotor 18 between extended and retracted positions within slots 42 radially provided in rotor 18. Outer ends 40 of vanes 36 are formed somewhat similar to a mushroom cap, when viewed in cross-section, to give greater strength to the vanes during operation. The outer ends 40. when fully extended, maintain a position close to interior sidewall 30 of housing 26. Vanes 36 are equally spaced from adjacent vanes upon rotor 18, and located such that there is always at least one vane positioned between the ports. Inward movement of vanes 36 with respect to the body of rotor 18 is achieved by second portion 34 of sidewall 30 acting as a cam surface to bear against outer end 40 of each vane 36 as that vane passes. Outer movement of vanes 36 is achieved by means of additional cam surfaces 43 (FIG. 4), one of which is provided on the inner surface of each end wall 28 of housing 26. These cam surfaces 43 are constructed and positioned so as to bear against inner ends 38 of vanes 36 to extend the vanes 36 outwardly when required, such as when the vanes are in the vicinity of the first portion 32. It will be noted that the distance between facing portions of cam surface 43 and the inner wall 30 of housing 26 is constant (and similar to the length of vanes 36) about the turbine.

As can be seen in FIG. 4, the sides of each vane 36 are provided with shoulders 44, which slide in corresponding guide slots 46 in rotor disks 48, which rotor disks rotate with rotor 18 on shaft 20. This shoulder and slot arrangement assists in stabilizing the movement of the vanes during operation of the turbine and enables the turbine to withstand significant fluid forces within the housing during its operation. This arrangement also acts to seal the ends of the vanes 36 from the adjoining chambers, and controls the movement of the vanes when fully extended so that they seat close to first portion 32 of the inner wall for 180° of rotor revolution, but do not contact it.

Assuming engine 2 as illustrated in the drawings is arranged for counterclockwise rotation of rotor 18, port 14 becomes an inlet port for chamber 6 to housing 26 and port 16 becomes an outlet port for chamber 8, while chamber 6 becomes a combustion chamber and chamber 8 an exhaust chamber. Feeding into combustion chamber 6, at its end opposite to inlet port 14 are injector nozzles 50, one to supply fuel under pressure from a supply line 52 and the other blowing in compressed air from a separate supply line 54. In the upper wall of chamber 6 is an electrical igniter 56 connected by appropriate wire 58 to an electrical source (not shown) to provide a spark as required. Igniter 56 is preferably located in the flow where the fuel/air streams have combined. In the upper wall of the other (exhaust) chamber 8, is located an exhaust valve 60 for port 62 communicating with exhaust chamber 10 which valve is actuated through actuator arms 64. It will be noted that combustion chamber 6 is provided with an exhaust valve 60, and exhaust chamber 8 is provided with an igniter 56 and wire 58 connected to a power source (again not illustrated) to provide a spark. This permits the chambers to reverse their functions for clockwise rotation of rotor 18.

Exhaust pipe 12 may feed to mufflers (not illustrated) or directly to outside air depending on the application.

In operation, with the rotor moving in a counterclockwise direction from a stopped position, compressed air and liquid fuel are metered and forced into (combustion) chamber 6 through spray inject nozzles 50. Upon a pre-timed signal, igniter 56 produces a spark from electrical current provided from an outside source. Combustion immediately commences, resulting in the rapid expansion of gases within chamber 6. This raises the pressure in the combustion chamber to levels in the 100 psi to 3000 psi range, depending on the amount of air/fuel supplied and rotor torque required. Pressure in chamber 6 is applied to the proximal extended vane 36 from rotor 18, through port 14, causing rotor 18 to turn counterclockwise. As the rotor turns, the volume of total space for the combustion gases shared by the relevant space between the proximal vanes 36 in turbine 4 and the space of chamber 6 is increased, and pressure starts to drop. Rotation of rotor 18 brings a second vane 36 out to an extended position and the still relatively high pressure in turbine 4 and the combustion chamber 6 again forces the rotor to continue to move. When additional pressure is required by rotor shaft 20, in response to the external load on the shaft, more air/fuel is sprayed into the combustion chamber 6 under pressure and the igniter, pretimed again, sparks, causing more combustion and expansion of gases. This again increases the pressure in chamber 6 and adjoining rotor inlet port 14, urging rotor vanes 36 to continue to move away in a rotating motion.

Pressures and oases in rotor 18 are partitioned into compartments within housing 26 about turbine 4 by vanes 36 which convey the same to exhaust port 16, letting gases out through port 62 upon the opening of exhaust valve 60 in chamber 8 into exhaust chamber 10 and exhaust pipe 12.

The frequency of air/fuel being sprayed in and the quantities of the needed air and flammable liquid, are predetermined and scheduled depending upon the load applied to rotor shaft 20 and the rpm desired.

When a reverse rotation of the rotor shaft 20 is required, the air/fuel injector and igniter in combustion chamber 6 become inactive and the exhaust valve 60 for that chamber is opened by urging from the external actuator arm assembly 64. The exhaust valve 60 in (now combustion) chamber 8 is closed and air/fuel lines 52/54 and injector nozzles 50 for chamber 8 are activated, allowing metered air and flammable fluids to be sprayed into chamber 8 where they are ignited by a pretimed spark from that chamber's igniter 56. Pressure increases and bears upon the opposite side of the proximal extended rotor vane 36 through port 16, causing that vane to move in a clockwise fashion and bring adjacent vanes 36 into operative alignment with respect to port 16 and chamber 8. Rotor 18 continues to rotate as urged by the pressure, in this clockwise direction. Again, frequency of the air/fuel input and igniter combustion, and quantities of the metered air and fuel are predetermined to respond to the load on the rotor shaft and rpm desired. In this manner, the present invention provides an engine, which permits either clockwise or counter-clockwise movement of shaft 20 at variable rpm's and torque levels.

The engine 2 according to the present invention has numerous applications in substitution of conventional internal combustion piston engines operating stationary mechanical equipment, electrical generating systems and vehicles used on land and water. Where continuous high levels of torque power are required without the use of inertia flywheels, fluid turbines 4 with the illustrated head configuration can be banked together on a shared central shaft 20 in numbers of two or greater with combustion occurring at staggered times. This arrangement overcomes drops of pressure between combustion ignitions.

Figure 5:
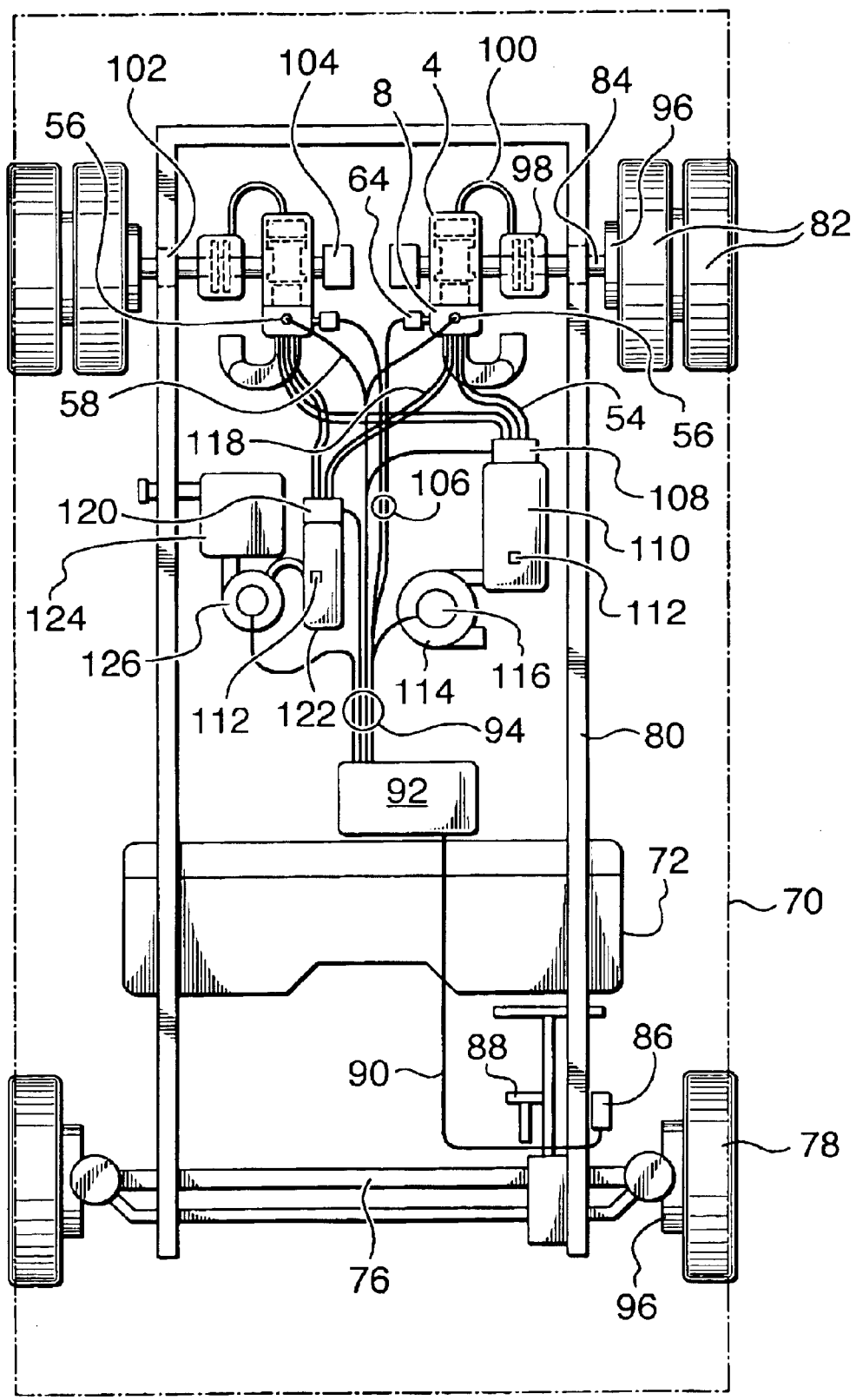
FIG. 5 is a schematic view at the chassis level of a truck having a pair of turbine engines according to the present invention.

FIG. 5 illustrates an application of the present invention to a truck. A pair of fluid turbines 4 in accordance with the present invention are applied to independent shafts 20, which serve each drive wheel.

More particularly, FIG. 5 is a schematic plan view of a truck at chassis level, with a body outline 70 and seat 72 positioned just behind a commonly arranged non-powered front axle 76 complete with a steering system, supported on steering tires 78. Truck frame 80 structurally connects drive wheels 82 and drive shafts or axles (corresponding to shafts 20) 84 with the front axle 76. Motion control for movement, direction and speed is provided by a pedal 86 operated by the driver positioned seat 72. Brake activator 88 is a second pedal activated by the driver. Signals wiring harness 90 transmits by electrical current motion control back to the control command center computer 92. This computer transmits electronic signals to the truck operating system through a control wiring harness 94. Reduced capacity brake system drums 96 are mounted adjacent to the wheels 78 and 82 respectively on axles 76 and 84. Mounted on each drive axle 84 is a diaphragm clutch 98 connected with a pressure line 100 linking the turbine pressure with the movable portion of the clutch plates. Drive axles 84 are secured and supported independently by spring and bearings assemblies 102 and end of drive axle bearing 104.

A fluid turbine 4 coupled to combustion and exhaust chambers 6 and 8 in accordance with the present invention is connected to each drive shaft 84. Igniter 56 is mounted in the combustion chamber portion 6 and is fed with electrical power by igniter wiring 58. Exhaust valve actuator arm assembly 64 is mounted proximal to exhaust chamber 8 and receives signals to operate from the control command central computer 92 via exhaust valve wiring 106. Compressed air is supplied to combustion chamber 6 by way of compressed air line 54 feeding from compressed air metering device 108, which again receives signals on the amount of compressed air required at the combustion chamber 6 by wiring from control command centre computer 92. Compressed air storage tank 110 from which compressed air metering device 108 receives its air, is fed by piping incorporating a one-way pressure valve 112 from an air compressor turbine 114, this being powered by an air compressor drive motor 116. Pressurized fuel is supplied to combustion chamber 6 by way of pressurized fuel line 118 feeding through pressurized fuel metering device 120 from pressurized fuel tank 122. Supply of fuel from fuel supply tank 124 is by way of pressurizing device, including a motor, 126 and an additional one-way pressure valve 112 mounted in the line adjacent to the pressurized fuel tank 122.

Thus, in this application for trucks, each drive wheel on the truck is provided with an engine 2 according to the present invention and a diaphragm clutch 98. A central fuel supply from tank 124 supplies all combustion chambers with pressure lines running independently to each such chamber. A central compressed air storage tank 110 is again linked independently with pressure lines to combustion chamber 6.

When movement of the truck is required, metered air/fuel are supplied to the combustion chamber 6 of each drive shaft mounted fluid turbine 4, and the appropriate igniter 56 starts combustion, increasing pressure in chamber 6 and the associated chamber between the rotor vanes 36 circumscribing port 14, causing the vanes 36 and shaft 84 to rotate. When high pressure between the rotating vanes 36 reaches the small pressure line 100 out of the housing of turbine 4 and leading to diaphragm clutch 98 on the split drive shaft 84, this will influence the movable portion of the clutch to engage the second portion of the clutch making the shaft between the rotor 18 and drive wheel 82 complete and causing the wheels to rotate in time with the turbine rotor 18, resulting in vehicle movement.

Central control of metered air/fuel and igniter spark timing to all combustion chambers and all drive wheels is controlled by computer 92 which will result in each wheel receiving equal rpm's and torque. When the vehicle is coasting and a decrease in speed is required, rotor 18 can greatly assist in slowing the vehicle by stopping combustion and controlling exhaust valves 60 out of both chambers 6 and 8, by creating a negative pressure in the former combustion chamber and closing down the exhaust valve 60 by the outlet port of the turbine, restricting the flow of pressure and creating a positive pressure urging extended rotor vanes 36 to slow down. This arrangement permits the truck to be operated in a; forward or reverse direction at varying speeds without the use of additional piston engines, transmissions, and differentials. Also, as thus described, the braking system capacity can be reduced since the fluid turbine 4 can assist in this function.

Because of the combustion chamber configuration of the engine 2 according to the present invention and the time permitted for combustion to occur, the engine according to the present invention may operate on any one of a number of flammable fuels including gasoline, diesel fuel, kerosene, ethanol or propane.

The engine 2 according to the present invention can also produce high torque rotary shaft power within an extremely short period of time, thus permitting a vehicle powered with this device, when stationary, even over short time frames, to be ready to go without using a non-driving idle mode. Inherent in the engine according to the present invention is the ability to efficiently provide much higher levels of rotary torque than with conventional piston engines when similar sizes and fuel consumptions are compared.

Also, tremendous versatility is available with the present invention, even at low rpm's, by making the rotor 18 larger in diameter, thus moving the pressure force supplied to the sides of vanes 36 out from the centre line of the shaft 20, thereby using the configuration to achieve large amounts of torque force. In an alternative embodiment, the combustion and exhaust heads may be spaced away from the turbine while communicating with same by extensions of pressure and heat withstanding piping. This configuration could also permit one set of combustion and exhaust heads to serve two or more turbines by means of manifolds.

Thus, it is apparent that there has been provided in accordance with the invention a system of combustion and exhaust heads for fluid turbine engines that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. An internal combustion rotary engine comprising:

a rotor having ends and a cylindrical sidewall;

a rotor disk at each end of the rotor to rotate with the rotor;

a housing encasing the rotor, the housing having interior end walls confronting the rotor ends and an interior sidewall, with fluid inlet and fluid outlet ports in the interior sidewall;

two or more vanes extending from end to end in the rotor and having inner and outer ends extending parallel to an axis of the rotor, each vane being movable radially inwardly and outwardly between retracted and extended positions with respect to the cylindrical sidewall of the rotor within slots therein, and each vane having side shoulders which slide in corresponding guide slots in the rotor disks, with the outer end of each vane positioned adjacent the inner wall of the housing;

a cam surface to move each of the vanes radially within an associated rotor slot between an extended position and a fully withdrawn position so that an outer extremity of each vane is positioned adjacent a corresponding first and second portion of the interior sidewall of the housing;

a combustion chamber communicating with the fluid inlet port;

an exhaust chamber communicating with the fluid outlet port;

air and fuel injection means associated with the combustion chamber for delivering an air and fuel mixture to the combustion chamber;

an igniter associated with the combustion chamber for igniting air and fuel mixture within the combustion chamber; and a controller for properly controlling the sequence of air and fuel injection, fuel ignition and exhaust valve opening and closing during operation of the engine, wherein a first portion of the interior sidewall of the housing being cylindrical and curved with constant radius over an angle of approximately 180°, the first portion being spaced a constant distance from corresponding portions of the cylindrical sidewall of the rotor;

wherein a second portion of the interior sidewall of the housing continuing from the extremities of the first portion of the interior sidewall and being of curvature of greater radius, the cylindrical sidewall of the rotor meeting the interior sidewall of the housing at a point between fluid inlet and fluid outlet ports about midway on the second portion, the fluid inlet and fluid outlet ports being located in this second portion of the interior sidewall of the housing, wherein each vane is spaced from adjacent vanes about the rotor such that there is always at least one vane positioned between inlet and outlet ports, wherein the rotor, housing and vanes are constructed so that, during operation of the device, fluid entering the housing drives the rotor until the adjacent vanes encompass the outlet port whereby the fluid is allowed to escape, and wherein, the fluid is carried by the rotor in compartments formed between adjacent vanes, and between the rotor cylindrical sidewall between the t vanes and the corresponding first and second portions of the interior sidewalls of the housing, and wherein the an exhaust chamber communicates with the outlet port, and the exhaust chamber is further provided with an exhaust valve which when closed seals the chamber and when opened permits exhaust gases in the chamber to escape.

2. The engine according to claim 1, wherein the exhaust chamber is provided with air and fuel injection means and an igniter means, and the combustion chamber is provided with an exhaust valve which when closed seals the chamber and when opened permits exhaust gases in the chamber to escape, and, wherein the control means for sequential operation of air and fuel injection and exhaust valve opening and closing during operation of the engine being arranged so as to convert the exhaust chamber to a combustion chamber and the combustion chamber to an exhaust chamber for opposite rotation of the rotor.

3. The engine according to claim 2, wherein an exhaust pipe is associated with the exhaust chamber and the combustion chamber so as to receive escaped exhaust gas from the exhaust chamber or the combustion chamber when an exhaust valve is open.

4. The engine according to claim 1, wherein an exhaust pipe is associated with the exhaust chamber so as to receive escaped exhaust gas from the exhaust chamber when the exhaust valve is open.

* * * * *